United States Patent
Seo

(10) Patent No.: US 12,019,997 B2
(45) Date of Patent: Jun. 25, 2024

(54) METHOD OF TRAINING REAL-TIME SIMULTANEOUS INTERPRETATION MODEL BASED ON EXTERNAL ALIGNMENT INFORMATION, AND METHOD AND SYSTEM FOR SIMULTANEOUS INTERPRETATION BASED ON EXTERNAL ALIGNMENT INFORMATION

(71) Applicant: ELECTRONICS AND TELECOMMUNICATIONS RESEARCH INSTITUTE, Daejeon (KR)

(72) Inventor: Young Ae Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 362 days.

(21) Appl. No.: 17/484,258

(22) Filed: Sep. 24, 2021

(65) Prior Publication Data
US 2022/0129643 A1    Apr. 28, 2022

(30) Foreign Application Priority Data

Oct. 28, 2020    (KR) .......................... 10-2020-0141062

(51) Int. Cl.
*G06F 40/40*    (2020.01)
*G10L 15/26*    (2006.01)

(52) U.S. Cl.
CPC .............. *G06F 40/40* (2020.01); *G10L 15/26* (2013.01)

(58) Field of Classification Search
CPC .................................. G06F 40/40; G10L 15/26
(Continued)

(56) References Cited

U.S. PATENT DOCUMENTS 10,198,435 B2 * 2/2019 Na .......................... G06N 3/045
2008/0306725 A1 * 12/2008 Moore .................... G06F 40/44
704/2
(Continued)

FOREIGN PATENT DOCUMENTS

KR    10-2020-0059625 A    5/2020
KR    10-2020-0072802 A    6/2020
KR    10-2195627 B1    12/2020

OTHER PUBLICATIONS

Baigong Zheng et al., "Simpler and Faster Learning of Adaptive Policies for Simultaneous Translation", arXiv 1909.01559v2, Sep. 12, 2019.
(Continued)

*Primary Examiner* — George C Monikang
(74) *Attorney, Agent, or Firm* — LRK PATENT LAW FIRM

(57) ABSTRACT

Provided is a method of training a real-time simultaneous interpretation model based on external alignment information, the method including: receiving a bilingual corpus having a source language sentence as an input text and a target language sentence as an output text; generating alignment information corresponding to words or tokens (hereinafter, words) in the bilingual corpus; determining a second action following a first action in the simultaneous interpretation model on the basis of the alignment information to generate action sequence information; and training the simultaneous interpretation model on the basis of the bilingual corpus and the action sequence information, wherein the first action and the second action represent a read action of reading the word in the input text or a write action of outputting an intermediate interpretation result corresponding to the read action performed up to a present.

11 Claims, 10 Drawing Sheets

(58) Field of Classification Search
USPC ...................................... 704/8–10, 246, 251
See application file for complete search history.

(56) References Cited

U.S. PATENT DOCUMENTS

2020/0117715 A1   4/2020   Lee et al.
2020/0159822 A1   5/2020   Roh et al.

OTHER PUBLICATIONS

Jiatao Gu, et al., "Learning to Translate in Real-time with Neural Machine Translation", arXiv: 1610.0038/8v3, Jan. 10, 2017.
Xutai Ma, et al., "SIMULEVAL : An Evaluation Toolkit for Simultaneous Translation", arXiv:2007.16193v1, Jul. 31, 2020.

* cited by examiner

FIG. 2

| INPUT TEXT | A | B | C | D | E | F | | | | | | |
|---|---|---|---|---|---|---|---|---|---|---|---|---|
| OUTPUT TEXT | | | | | | | A' | B' | D' | C' | E' | F' |
| ACTION SEQUENCE | R | R | R | R | R | R | W | W | W | W | W | W |

FIG. 3

| INPUT TEXT | A | | B | | C | | | D | | E | | F | |
|---|---|---|---|---|---|---|---|---|---|---|---|---|---|
| OUTPUT TEXT | | A' | | B' | | | D' | | | C' | | E' | | F' |
| ACTION SEQUENCE | R | W | R | W | R | P | W | K | R | W | R | W | R | W |

FIG. 4

| INPUT TEXT | A | | B | | C | | D | | E | | F | |
|---|---|---|---|---|---|---|---|---|---|---|---|---|
| OUTPUT TEXT | | A' | | B' | | D' | | C' | | E' | | F' |
| ACTION SEQUENCE | R | W | R | W | R | W | R | W | R | W | R | W |

FIG. 5

| INPUT TEXT | A | B | | C | | D | | | E | | F | |
|---|---|---|---|---|---|---|---|---|---|---|---|---|
| OUTPUT TEXT | A' | | B' | | | | D' | C' | | E' | | F' |
| ACTION SEQUENCE | R | W | R | R | K | R | W | W | R | W | R | W |

FIG. 6

| INPUT TEXT | A | | B | | C | D | | | E | | F | |
|---|---|---|---|---|---|---|---|---|---|---|---|---|
| OUTPUT TEXT | | A' | | B' | | | D' | C' | | E' | | F' |
| ACTION SEQUENCE | R | W | R | W | R | R | W | W | R | W | R | W |

FIG. 7

| INPUT TEXT | A | B | C | D | E | F |
|---|---|---|---|---|---|---|
| OUTPUT TEXT | A' | B' | D' | C' | E' | F' |
| ALIGNMENT INFORMATION | 0-0 | 1-1 | 2-3 | 3-2 | 4-4 | 5-5 |
| ACTION SEQUENCE | R W | R W | R R | W W | R W | R W |

FIG. 8

| INPUT TEXT | A | B | C | D | E | F | | | | |
|---|---|---|---|---|---|---|---|---|---|---|
| OUTPUT TEXT | | | | A' | | B' | C' | D' | E' | F' |
| ACTION SEQUENCE | R | R | R | W | R | W | W | W | W | W |

FIG. 9

| INPUT TEXT | A | B | C | D | E | F | | | | |
|---|---|---|---|---|---|---|---|---|---|---|
| ACTION-COMBINED OUTPUT TEXT | ## | ## | ## | ## | A' | ## | B' | ## | D' C' E' | F' |

METHOD OF TRAINING REAL-TIME SIMULTANEOUS INTERPRETATION MODEL BASED ON EXTERNAL ALIGNMENT INFORMATION, AND METHOD AND SYSTEM FOR SIMULTANEOUS INTERPRETATION BASED ON EXTERNAL ALIGNMENT INFORMATION

CROSS-REFERENCE TO RELATED APPLICATION

This application claims priority to and the benefit of Korean Patent Application No. 10-2020-0141062, filed on Oct. 28, 2020, the disclosure of which is incorporated herein by reference in its entirety.

BACKGROUND

1. Field of the Invention

The present invention relates to a method of training a real-time simultaneous interpretation model and a method and system for simultaneous interpretation on the basis of external alignment information.

2. Description of Related Art

In the conventional real-time simultaneous interpretation technology, the main concern for technological advancement was performance of simultaneous interpretation. In other words, improving the accuracy of speech recognition and automatic translation technologies that constitute a simultaneous interpretation system was the main concern.

In recent years, the utilization of applying simultaneous interpretation technology to an actual environment has been emphasized, but there is a difficulty in rapidly providing a simultaneous interpretation result to a listener, and there is a limitation in terms of utilization.

SUMMARY OF THE INVENTION

The present invention is directed to providing a method of training a real-time simultaneous interpretation model and a method and system for simultaneous interpretation on the basis of external alignment information that are capable of training a simultaneous interpretation model using word alignment information between a source language and a target language provided outside the simultaneous interpretation model together with a bilingual corpus, and providing an intermediate interpretation result even when a speaker's utterance is not completed.

The technical objectives of the present invention are not limited to the above, and other objectives may become apparent to those of ordinary skill in the art based on the following description.

According to the first aspect of the present invention, there is provided a method of training a real-time simultaneous interpretation model based on external alignment information, the method including receiving a bilingual corpus having a source language sentence as an input text and a target language sentence as an output text, generating alignment information corresponding to words or tokens (hereinafter, words) in the bilingual corpus, determining a second action following a first action in the simultaneous interpretation model on the basis of the alignment information to generate action sequence information, and training the simultaneous interpretation model on the basis of the bilingual corpus and the action sequence information, wherein the first action and the second action represent a read action of reading the word in the input text or a write action of outputting an intermediate interpretation result corresponding to the read action performed up to a present.

According to the second aspect of the present invention, there is provided a method for real-time simultaneous interpretation using a simultaneous interpretation model trained based on external alignment information, the method including generating a speech recognition result for a speech uttered by a speaker in real time, inputting the speech recognition result into a pre-trained simultaneous interpretation model, selecting one of a read action of further receiving the speech of the speaker and a write action of outputting an intermediate interpretation result corresponding to the read action performed up to a present in the simultaneous interpretation model, and providing an interpretation result on the basis of the selected action, wherein the pre-trained simultaneous interpretation model is trained on the basis of a bilingual corpus having a source language sentence as an input text and a target language sentence as an output text and alignment information corresponding to words or tokens (hereinafter, words) in the bilingual corpus.

According to the third aspect of the present invention, there is provided a system for real-time simultaneous interpretation based on external alignment information, the system including a communication module configured to receive a speech recognition result for a speech uttered by a speaker in real time and output a simultaneous interpretation result corresponding to the uttered speech, a memory configured to store a program for generating and providing the simultaneous interpretation result on the basis of a pre-trained simultaneous interpretation model, and a processor configured to execute the program stored in the memory, wherein the processor executes the program for selecting one of a read action of further receiving the speech of the speaker and a write action of outputting an intermediate interpretation result corresponding to the read action up to a present in the simultaneous interpretation model and provide an interpretation result based on the selected action, and the processor trains the simultaneous interpretation model on the basis of a bilingual corpus having a source language sentence as an input text and a target language sentence as an output text and alignment information corresponding to words or tokens (hereinafter, words) in the bilingual corpus.

In addition, other methods and other systems for implementing the present invention, and a computer readable recoding medium that records a computer program for executing the method may be further provided.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIG. 2 is a diagram for describing a simultaneous interpretation processing process after a sentence unit input is completed;

FIG. 3 is a diagram for describing a simultaneous interpretation processing process with an interpretation delay of zero which considers a predict action and a keep action;

FIG. 4 is a diagram for describing a simultaneous interpretation processing process with an interpretation delay of zero which only specifies read and write actions in FIG. 3;

FIG. 5 is a diagram for describing a simultaneous interpretation processing process excluding a predict action in an embodiment of the present invention;

FIG. 6 is a diagram for describing a simultaneous interpretation processing process having a minimized interpretation delay which specifies only read and write actions in FIG. 5;

FIG. 7 is a diagram for describing action sequence information extracted on the basis of alignment information in an embodiment of the present invention;

FIG. 8 is a diagram illustrating action sequence information pursuant to additionally performing a read action a predetermined number of times;

FIG. 9 is a diagram illustrating an example of an action-combined output text;

DETAILED DESCRIPTION OF EXEMPLARY EMBODIMENTS

Figure 1:
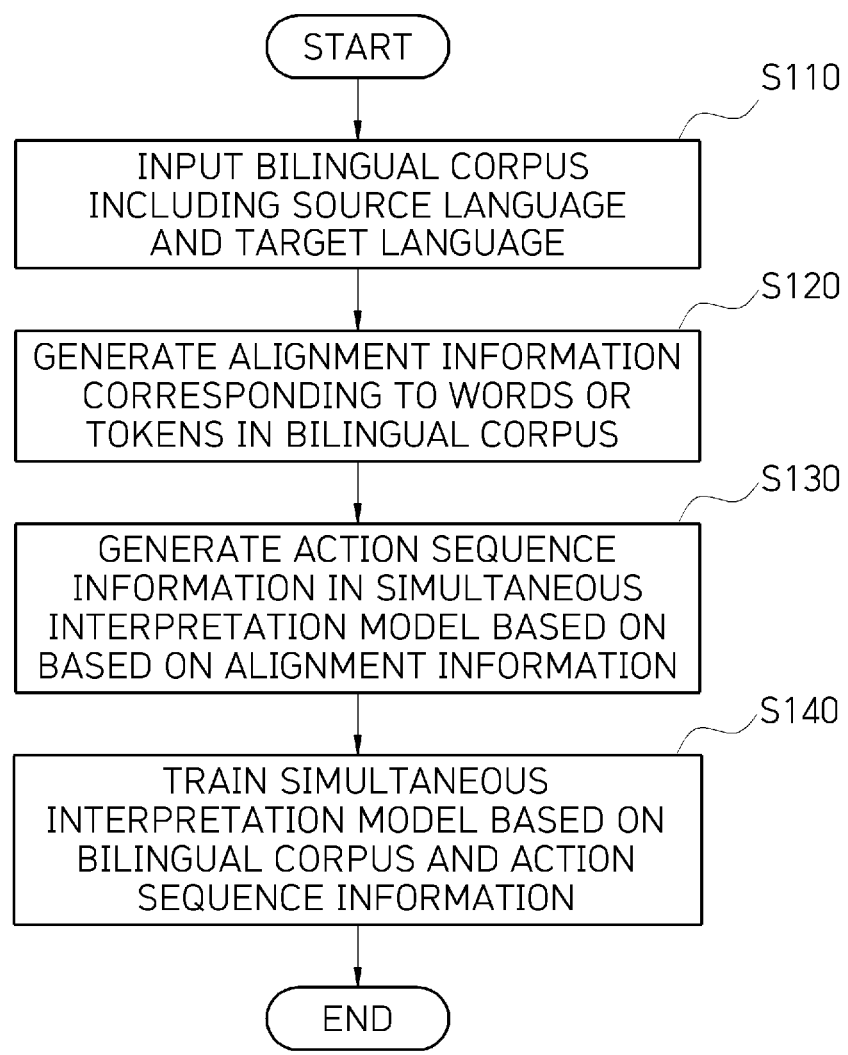
FIG. 1 is a flowchart showing a method of training a real-time simultaneous interpretation model according to an embodiment of the present invention.

Hereinafter, the advantages and features of the present invention and ways of achieving them will become readily apparent with reference to descriptions of the following detailed embodiments in conjunction with the accompanying drawings. However, the present invention is not limited to such embodiments and may be embodied in various forms. The embodiments to be described below are provided only to assist those of ordinary skill in the art in fully understanding the scope of the present invention, and the scope of the present invention is defined only by the appended claims.

Terms used herein are used to aid in the explanation and understanding of the embodiments and are not intended to limit the scope and spirit of the present invention. It should be understood that the singular forms "a" and "an" also include the plural forms unless the context clearly dictates otherwise. The terms "comprises," "comprising," "includes," and/or "including," when used herein, specify the presence of stated features, integers, steps, operations, elements, components and/or groups thereof and do not preclude the presence or addition of one or more other features, integers, steps, operations, elements, components, and/or groups thereof. In connection with assigning reference numerals to elements in the drawings, the same reference numerals are used to designate the same elements through the whole specification, and the term "and/or" includes any one or combinations of the associated listed items. It should be understood that, although the terms "first," "second," etc. may be used herein to describe various elements, these elements are not limited by these terms. These terms are only used to distinguish one element from another. For example, a first element could be termed a second element without departing from the scope of the present invention.

Unless otherwise defined, all terms (including technical and scientific terms) used herein have the same meaning as commonly understood by one of ordinary skill in the art to which this invention belongs. It should be further understood that terms, such as those defined in commonly used dictionaries, should not be interpreted in an idealized or overly formal sense unless expressly so defined herein.

The present invention relates to a method of training a real-time simultaneous interpretation model, a method for simultaneous interpretation, and a system 100 for simultaneous interpretation on the basis of external alignment information.

In the case of an automatic translation system, a sentence is usually regarded as a basic unit of interpretation, thus only the accuracy of interpretation is considered an important factor. However, a simultaneous interpretation system is different from the automatic translation system in that promptness of providing interpretation results needs to be considered in addition to the accuracy of the interpretation results.

The promptness of providing interpretation results depends on how rapidly interpretation results are provided to a listener from the time a speaker starts speaking. Therefore, the shorter the ear-voice span, that is, a difference between a time when the speaker speaks and a time when the interpretation result is provided to the listener, the better. In general, the existing simultaneous interpretation system often provides the interpretation result to a user at a point when the speaker finishes a sentence unit speech or when a stoppage of a significantly long speech occurs. Therefore, when the speaker speaks in the form of a long sentence without interruption, the listener feels frustrated due to not receiving the interpretation result until the end of the sentence unit speech. Typically, the listener feels frustrated without receiving an interpretation result for four to five seconds.

Therefore, the simultaneous interpretation system needs to continuously determine whether it is allowable to provide an intermediate interpretation result to the listener even when the sentence unit utterance of the speaker is not completed, and at a time allowable to provide the intermediate interpretation result, provide the listener with the interpretation result for utterances spoken by the speaker so far so as to ensure the promptness of providing interpretation results.

As in the case of the automatic translation system, in the case of a simultaneous interpretation system that converts a source language into a target language on the basis of deep learning using a neural network, a high-quality bilingual corpus including a source language and a corresponding target language is a very important resource. However, in the existing bilingual corpuses, only the correspondence relationship between the source language and the target language is established, and most of the previously acquired corpus have sentences mapped in a sentence-to-sentence unit without considering promptness of simultaneous interpretation, so there is a need to develop a technology of learning determination whether it is a time at which an intermediate interpretation result is providable.

One of the conventional methods is provided to determine a unit of simultaneous interpretation for an utterance of a speaker in advance in consideration of linguistic or phonetic characteristics, translate the utterance, and provide the result. The method has a benefit of using separate resources other than the bilingual corpus for determining the interpretation unit in learning but has a limitation in that the interpretation unit is determined in advance without being linked with the interpretation result.

Another method is provided to, when training a neural network-based simultaneous interpretation system using a bilingual corpus, allow a quality of considering both accuracy and delay of translation to be learned through a loss function during training in order to determine whether a part is available as an interpretation unit, thereby reflecting not only the accuracy but also some amount of promptness. The method may train the simultaneous interpretation system using only the existing bilingual corpus. However, since most of the existing bilingual corpuses are constructed in units of sentences without considering simultaneous interpretation, the method operates appropriately between some languages that have a small difference in word order, but for a language pair having a large difference in word order, such as English and Korean, has a difficulty in learning due to having to learn accuracy and promptness at the same time.

As described above, in order to determine a unit available for simultaneous interpretation, there is a need to determine whether translation is performable with only words spoken at a certain time. Such a determination may be easily achieved when alignment information between words in bilingual sentences is provided. According to an embodiment of the present invention, word alignment information is additionally provided to a bilingual corpus used for training a simultaneous interpretation model so that both the accuracy and the promptness of interpretation results may be provided.

Hereinafter, a method of training a real-time simultaneous interpretation model based on external alignment information (hereinafter, a real-time simultaneous interpretation model training method) according to an embodiment of the present invention will be described with reference to FIGS. 1 to 9.

A typical real-time simultaneous interpretation system is configured by sequentially combining a speech recognition module that uses a speech as an input and outputs a character and a translation module that translates the recognized character string, and combining a speech synthesis module that outputs the translated character string back to a speech when needed. Recently, there has been development of a simultaneous interpretation system that converts an input speech directly into a translated character string or a speech without being subdivided into such modules.

Embodiments of the present invention are applicable to both of the methods described above but, for the sake of convenience in description, will be described assuming a configuration that sequentially combines a speech recognition module and a translation module with each other.

A recent automatic translation system applied to a real-time simultaneous interpretation system is a neural network-based automatic translation (neural machine translation (NMT)) system. A general NMT system is provided in the form of an encoder-decoder with an attention mechanism added thereto. A general NMT system abstracts a source language into a vector through an encoder using a recursive artificial neural network (RNN), a convolutional neural network (CNN), or a transformer model having a self-attention mechanism that has recently shown excellent performance, transforms the result into a vector corresponding to a desired target vocabulary using the attention mechanism, and then converts the target vector to generate an interpretation result of the target language using a decoder.

FIG. 1 is a flowchart showing a method of training a real-time simultaneous interpretation model according to an embodiment of the present invention.

Meanwhile, each of the operations shown in FIG. 1 may be understood as being performed by a server (hereinafter, referred to as a server) forming a real-time simultaneous interpretation system 100, but the present invention is not limited thereto.

The server generates a speech recognition result for a speech uttered by a speaker in real time and inputs the speech recognition result into a trained simultaneous interpretation model. In this case, the speech of the speaker may be converted into the form of text, and in this process, various noises included in the recognized utterance may be identified and removed. In addition, speeches that are included in the utterance of the speaker but are not used for translation may be identified and removed.

The simultaneous interpretation model determines one of a read action and a write action. When actions performed during simultaneous interpretation are largely divided into a read action and a write action, the simultaneous interpretation model determines whether to further receive a speech recognition result unit (i.e., whether to perform a read action) or output an intermediate interpretation result based on inputs up to the present (i.e., whether to perform a write action).

Thereafter, the server provides a listener with the interpretation result according to performance of the selected action. When it is determined to perform a write action in the simultaneous interpretation model, the server provides the listener with an intermediate interpretation result corresponding to read actions up to the present.

On the other hand, in order to further improve promptness and accuracy, the embodiment of the present invention needs to train the simultaneous interpretation model.

To this end, the server receives a bilingual corpus having a source language sentence as an input text and a target language sentence as an output text (S110).

Then, the server generates alignment information corresponding to words or tokens (hereinafter, words) in the bilingual corpus (S120) and determines a second action following a first action in the simultaneous interpretation model on the basis of the alignment information to generate action sequence information (S130). In this case, the first and second actions correspond to a read action of reading a word in the input text or a write action of outputting an intermediate interpretation result corresponding to read actions up to the present.

After the action sequence information is generated as described above, the server trains the simultaneous interpretation model on the basis of the bilingual corpus and the action sequence information (S140).

In this case, when the first action is a read action and the second action is a write action, the write action is an action of outputting a result of direct intermediate interpretation of a word corresponding to the read action or an action of outputting a result of intermediate interpretation of a word predicted to be arranged at a location of the word corresponding to the read action.

On the other hand, the first action and the second action are not limited to actions having been performed at specific points in time. That is, the first action and the second action need to be interpreted as referring to a series of consecutive actions.

The following description will be made first on an example of using action sequence information with respect to an input text and an output text and then on a generation of action sequence information using alignment information.

FIG. 2 is a diagram for describing a simultaneous interpretation processing process after a sentence unit input is completed. FIG. 2 shows a process in which input words are received based on processing time and output words are output, and corresponding processing actions of the simultaneous interpretation system.

It is assumed that an input text 'A B C D E F' formed in a source language corresponds to an output text 'A' B' D' C' E' F'' formed in a target language.

When actions in automatic translation are largely divided into a read action (Read, hereinafter R) and a write action (Write, hereinafter W), as shown in the example of FIG. 2, the automatic translation starts to write the words in the output text after reading all the words in the input tex. In the example, A, B, C, D, E, and F are words corresponding to a source language, and A', B', C', D', E', and F' are target language words mapped with the respective the source language words.

Meanwhile, for the sake of convenience in description, the present invention is described in relation to words, but the same may apply to tokens, which are smaller units of a word being divided.

An action sequence involves actions in the process of automatic translation, where R stands for read and W stands for write. Accordingly, the input text 'ABCDEF' shown in FIG. 2 is subject to actions 'RRRRRRWWWWWW,' that is, six write actions after six read actions, to generate an output text 'A' B' D' C' E' F'.'

FIG. 3 is a diagram for describing a simultaneous interpretation processing process with an interpretation delay of 0 which considers a predict action and a keep action. FIG. 4 is a diagram for describing a simultaneous interpretation processing process with an interpretation delay of 0 which only specifies read and write actions in FIG. 3.

When real-time simultaneous interpretation is performed, actions may be divided into read, write, keep, and predict actions. A keep action and a predict action are used due to the difference in word order between the two languages. The keep action refers to a case where a speaker has already spoken and a target word for the corresponding word has not been output, but the target word for the spoken word is subsequently output. Conversely, the predict action refers to an action, for a word in an input text which has not yet uttered performing prediction in advance through context and the like in order to utter a target word for the promptness of simultaneous interpretation.

With respect to the input text and output text in FIG. 2, when assuming a simultaneous interpretation system in the form of reading one word of the input text and immediately outputting one word of the output text with an interpretation delay of 0, that is, such as having one output for one input word, an action sequence in the corresponding simultaneous interpretation model is shown as in FIG. 3.

Referring to FIG. 3, the simultaneous interpretation model reads A, for the first word of the input text, through a read action R and writes A' through a write action W, and the simultaneous interpretation model reads B through a second read action R and writes B' through a second write action W. After that, the simultaneous interpretation model reads C through a third read action R, predicts D' corresponding to D, which has not yet been uttered and received, through a predict action P, and performs a write action W to output D', wherein information about C that has not yet been output is kept through a keep action K. In this case, the order of P, W, and K is an example and may be exchanged from each other. After that, the simultaneous interpretation model reads D through a read action R, and writes C', which corresponds to the kept C, through a write operation W. Thereafter, actions R and W are sequentially performed for two rounds to read and write E, E', F, and F' to complete simultaneous interpretation for the input and output texts.

The simultaneous interpretation model with an interpretation delay of 0 as illustrated in FIG. 3 is formed to, when the input text and the output text have the same length, output one word as soon as the speaker speaks one word. However, in a state in which sufficient information is not provided, the simultaneous interpretation model has great difficulty in predicting an output word for a word that has not been input, which leads to low accuracy of simultaneous interpretation.

Here, the keep action K and the predict action P are for characterizing and referring to a processing procedure performed inside the simultaneous interpretation model to aid in the description of the system operation method, and in practice, as actions needing to be learned for simultaneous interpretation, the simultaneous interpretation model is only required to determine read and write actions R and W. Therefore, the action sequence needing to be learned by the simultaneous interpretation model for the above input and output texts is provided in a form in which one output word is generated for one input word while excluding P and K, as shown in FIG. 4.

FIG. 5 is a diagram for describing a simultaneous interpretation processing process excluding a predict action in an embodiment of the present invention. FIG. 6 is a diagram for describing a simultaneous interpretation processing process having a minimized interpretation delay which specifies only read and write actions in FIG. 5.

The embodiment of the present invention, unlike FIGS. 3 and 4, includes only a read action R, a write action W, and a keep action K, excluding a predict action which is less accurate. The simultaneous interpretation model provides the result of interpretation to the listener as soon as a write action W occurs.

Similarly, in FIG. 5, the keep action K is also for characterizing and referring to a processing procedure performed inside the simultaneous interpretation model to aid in the description of the system operation method, and in practice, as actions needing to be learned for simultaneous interpretation, the simultaneous interpretation model is only required to learn read and write actions R and W. Therefore, the action sequence needing to be learned by the simultaneous interpretation model for the above input and output texts is provided in a form excluding a keep action K, as shown in FIG. 6. That is, FIG. 6 illustrates an action sequence that minimizes an interpretation delay while preventing a predict action P from occurring in the simultaneous interpretation model.

Meanwhile, in the case of the simultaneous interpretation system 100 proposed in the present invention, an input of one input word may not be followed by generation of an output word. That is, no words may be output, or a plurality of words may be serially output all at once.

FIG. 7 is a diagram for describing action sequence information extracted on the basis of alignment information in an embodiment of the present invention.

In one embodiment of the present invention, the server is characterized as generating alignment information corresponding to words in a bilingual corpus and generating action sequence information on the basis of the alignment information.

That is, the server derives optimal action sequence information on the basis of external alignment information and learns an interpretation unit of the simultaneous interpretation model on the basis of the optimal action sequence information. In this case, the 'external' alignment information refers to alignment information which is generated by a hardware or software configuration that is distinguished from the simultaneous interpretation model.

The server first extracts alignment information between words using a separate alignment information extraction method on the basis of a source language corpus and a target language corpus to provide an action sequence.

In an embodiment of the present invention, the alignment information between words may be extracted using various methods. For example, as a tool for providing alignment information between words using a statistical technique, various toolkits, such as GIZA++, Berkeley Word Alinger, and Fast Align, which are already open to the public, are used, but are low in accuracy rate.

As another method, the word alignment information may be extracted using an automatic translation model. A neural network-based automatic translation system with an attention mechanism, when learning a translation function with a bilingual corpus, learns the degree to which an input word is attentively viewed during generation of each output word so that alignment information between words may be extracted on the basis of the degree to which input words are focused.

In addition, in order to learn alignment information between words, a separate model may be trained, such as using a method in which a model (such as a Bidirectional Encoder Representations from Transformers (BERT) or Generative Pre-Traing 2 (GPT-2) pre-trained on a quality of understanding language from a large capacity corpus) is used to learn a word alignment task. In addition, according to an embodiment of the present invention, word alignment information having a higher accuracy rate may be extracted using various techniques.

For example, when words of an input text and an output text are mapped with each other as follows, alignment information of words obtained through an external module may be expressed in the following form.

Input text: A B C D E F
Output text: A' B' D' C' E' F'
Alignment information: 0-0 1-1 2-3 3-2 4-4 5-5

Here, to the left of '-' is an index of an input word, to the right of '-' is an index of a corresponding output word, and the index starts from 0. That is, the server may match indexes of words in an input text with corresponding indexes of words in an output text in a bilingual corpus to generate alignment information.

After the alignment information between words is generated, the server generates action sequence information on the basis of the alignment information.

FIG. 7 is a diagram for describing action sequence information extracted on the basis of alignment information.

In one embodiment, the server extracts a first input word index i for a word of an input text corresponding to a read action performed up to the present and extracts a first output word index j−1 for a word of an output text corresponding to a write action prior to the read action performed up to the present.

Then, the server, on the basis of alignment information of a word of the output text having a second output word index j that needs to be output after the first output word index j−1, extract words of the input text having an alignment relationship with the second output word index j. For example, input words having an alignment relationship with a word of the output text having the second output word index j are extracted as $s_1, s_2, \ldots,$ and $s_k$.

Thereafter, the server compares a word among the extracted words $s_1, s_2,$ and $s_k$ of the input text which has a largest index $max\_s_i$ with the first input word index i and records a read action or a write action in the action sequence information on the basis of the comparison result.

In one embodiment, the server, when the first input word index i is smaller than the largest index $max\_s_i$, records a read action R in the action sequence information, and conversely, when the first input word index i is greater than or equal to the largest index $max\_s_i$, records a write action W in the action sequence information.

After the recording of the read action in the action sequence information, the server compares a second input word index i+1 for a word of the input text corresponding to an index next to the first input word index i with the largest index $max\_s_i$, and when the second input word index i+1 is smaller than the largest index $max\_s_i$, records a read action R in the action sequence information, and when the second input word index i+1 is greater than the largest index $max\_s_i$, records a write action W in the action sequence information.

The server repeats the above operation until reading and writing all the words of the input and output texts to generate action sequence information. The generated action sequence information is provided as shown in FIGS. 6 and 7, and FIG. 7 shows an embodiment of an action sequence that may be extracted on the basis of an input text, an output text, and alignment information.

On the other hand, the number of actions included in the action sequence information is the sum of the numbers of the read actions and the write actions, so the action sequence information is equal to 'the number of input words in the input text+the number of output words in the output text.' In generating such action sequence information, the embodiment of the present invention may employ various heuristic rules. The action sequence in FIG. 7 is provided in a form that, when reading of an input word is immediately followed by generation of a mapping output word, immediately generates and outputs the output word.

However, in order to increase the accuracy of the translation, it is preferable to generate a translation result after receiving more words that are spoken later. To this end, the server may further perform the read action R a predetermined number of times as a second action following the first action.

FIG. 8 is a diagram illustrating action sequence information subsequent to additionally performing a read action a predetermined number of times.

For example, an action sequence of immediate output only considering alignment information is shown in FIG. 7, while an action sequence further having an arbitrary read action R is shown in FIG. 8. The action sequence of FIG. 8 is provided in a form that does not immediately perform output but unconditionally further reads the following three words and determines whether to perform output. In other words, rather than performing a write action W of outputting immediately after reading A through a first read action as shown in FIG. 7, three read actions R are further performed to read 'B', 'C', and 'D' and then output A' through a write action W. After that, a read action R is performed once more to read E, and then a write action W is performed to output B'. Then, as F is read to complete the reading to the end of the input text, the remaining write actions W are consecutively performed to output D', C', E', and F'. According to such an embodiment, the interpretation delay is slightly degraded compared to training a simultaneous interpretation model through the action sequence information of FIG. 7, but the interpretation accuracy is improved because the interpretation results are output by viewing more words.

In configuring the action sequence as in the above-described embodiment, the present invention is characterized as employing alignment information between words and may reflect various input and output schedule rules based on the alignment information between words to adjust the action sequence. As described above, the action sequence information may be constructed along with the input and output texts and may be used to train the simultaneous interpretation model.

Hereinafter, an example of a simultaneous interpretation model according to an embodiment of the present invention will be described.

In the embodiment of the present invention, a neural network-based simultaneous interpretation model for action sequence learning may be configured in various forms. In one embodiment, the simultaneous interpretation model may be trained by training a neural network-based automatic translation system having an encoder and a decoder on the basis of maximum likelihood estimation (MLE) while employing a method of adding a symbol referring to a read actin as an output word.

In other words, the server generates an action-combined output text having the read action of the action sequence information replaced with a preset special symbol (e.g., '##') and the write action of the action sequence information replaced with an output word of the output text. In addition, the server may train the simultaneous interpretation model on the basis of the input text and the action-combined output text.

FIG. 9 is a diagram illustrating an example of an action-combined output text.

The server replaces a read action R of the action sequence with a special symbol '##', and replaces a write action W of the action sequence with an output word corresponding to the write action and uses the action sequence having the special symbol '##' and the output word as an output text (an action-combined output text). That is, the server is given action sequence information for an original input text and an output text as shown in FIG. 8 and changes the given information into an input text and an action-combined output text as shown in FIG. 9. Such a pair of an input text and an action-combined output text may be learned in a way of the existing deep learning-based automatic translation model.

A general auto-regressive deep learning based automatic translation model learns, from parameters θ of a neural network, a parameter θ that may maximize the probability of Equation 1 below, on the basis of a bilingual corpus (x, y) consisting of source language sentences x and target language sentences y using MLE.

$$p(y|x;\theta)=\Pi_{t=1}^{|y|}p(y_t|x,y_{<t};\theta)$$ [Equation 1]

An embodiment of the present invention uses a deep learning-based automatic translation model according to Equation 1 to input texts, which are given as inputs up to the present at the current time t, to an encoder of a simultaneous interpretation model (an automatic translation model), and outputs an output text corresponding to the input text from a decoder of the simultaneous interpretation model (the automatic translation model) at the current time t.

As an example, the simultaneous interpretation model, when receiving $x_{\leq g(t)}$ given as inputs up to the present at the current time t and determining the next output word $y_t$, learns a parameter θ that may maximize the probability of Equation 2 below.

$$p_g(y|x;\theta)=\Pi_{t=1}^{|y|}p(y_t|x_{\leq g(t)},y_{<t};\theta)$$ [Equation 2]

Here, g(t) is a monotonic reduction function for the number of previous context words that needs to be referenced by the encoder in order to output decoding $y_t$ at the current time t, and the monotonic reduction function is in a range of $0 \leq g(t) \geq |x|$.

In a process subsequent to completion of the training of the simultaneous interpretation model and performed by receiving a utterance of a speaker and outputting a simultaneous interpretation result, that is, in an inference, the simultaneous interpretation model is configured to, upon a symbol '##' representing a read action appearing as an output word, wait to receive an utterance of the next speaker and receive the next utterance of the speaker, and upon a symbol, except for '##', being output, deliver an intermediate interpretation result to the listener to thereby perform simultaneous interpretation.

As another embodiment of the simultaneous interpretation model, the simultaneous interpretation model may be configured by constructing an automatic translation model including a conventional encoder and decoder to receive a real-time utterance of a speaker and adding a separate network for a simultaneous interpretation action determination to determine one of a read action R and a write action W on the basis of state information of the encoder and the decoder to perform learning using an input text, an output text, and an action sequence as a learning corpus. In this case, when the action determination network determines a write action, an output result of the decoder is output as an interpretation result.

Meanwhile, the configuration of the simultaneous interpretation model described in the present invention is merely provided as an example and may include all types of methods of learning using a source language sentence, a target language sentence, external alignment information between the source language sentence and the target language sentence or action sequence information based on the external alignment information as a learning corpus.

Hereinafter, a real-time simultaneous interpretation method according to another embodiment of the present invention will be described with reference to FIG. 10.

Figure 10:
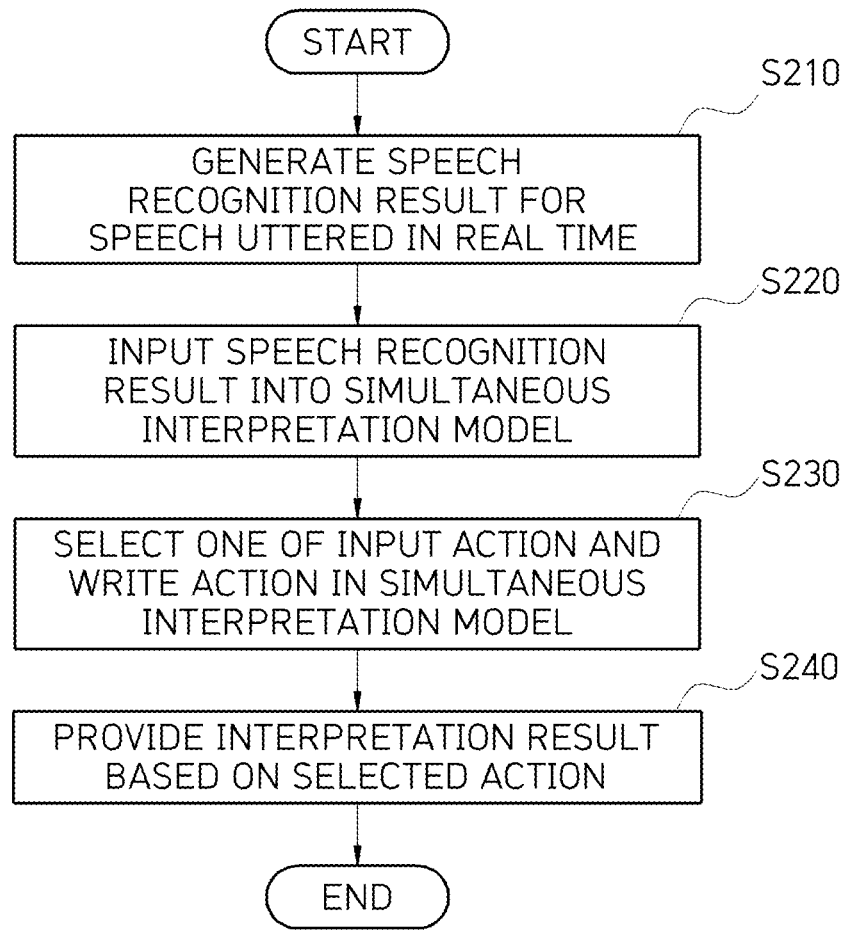
FIG. 10 is a flowchart showing a real-time simultaneous interpretation method according to an embodiment of the present invention.

FIG. 10 is a flowchart showing a real-time simultaneous interpretation method according to an embodiment of the present invention.

First, the server receives a speech uttered by a speaker in real time and generates a speech recognition result for the speech (S210) and inputs the speech recognition result into a pre-trained simultaneous interpretation model (S220).

Next, the server selects one of an input action of further receiving a speech of the speaker and a write action of outputting an intermediate interpretation result corresponding to the read action up to the present in the simultaneous interpretation model (S230) and provides an interpretation result based on the selected action (S240).

In this case, the pre-trained simultaneous interpretation model is trained on the basis of a bilingual corpus using a source language sentence as an input text and a target language sentence as an output text and alignment information corresponding to words or tokens in the bilingual corpus.

Meanwhile, in the above description, operations S110 to S240 may be further divided into a larger number of operations or combined into a smaller number of operations according to examples of implementation of the present invention. In addition, some of the operations may be omitted or may be executed in the reverse order as needed. Parts omitted in the following description, which have been described above with reference to FIGS. 1 to 9, may be applied to the description shown in FIGS. 10 and 11.

Figure 11:
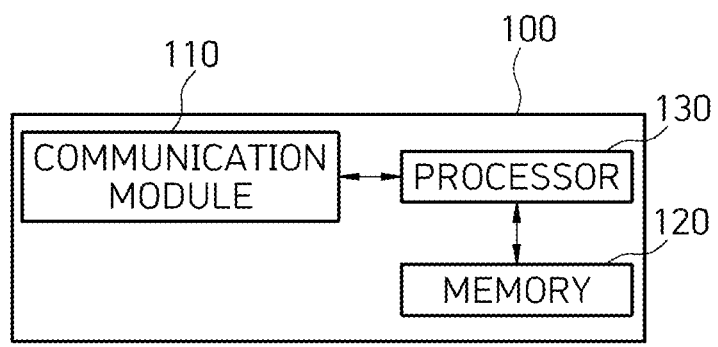
FIG. 11 is a block diagram illustrating a real-time simultaneous interpretation system based on external alignment information according to an embodiment of the present invention.

FIG. 11 is a block diagram illustrating a real-time simultaneous interpretation system 100 based on external alignment information according to an embodiment of the present invention.

The real-time simultaneous interpretation system 100 according to the embodiment of the present invention includes a communication module 110, a memory 120, and a processor 130.

The communication module 110 receives a speech recognition result for a speech uttered by a speaker in real time and outputs a simultaneous interpretation result corresponding to the uttered speech.

The memory 120 stores a program for generating and providing a simultaneous interpretation result on the basis of the pre-trained simultaneous interpretation model, and the processor 130 executes the program stored in the memory 120.

The processor 130 executes the program to select one of a read action of further receiving a speech of the speaker and a write action of outputting an intermediate interpretation result corresponding to the read action up to the present in the simultaneous interpretation model and provides an interpretation result based on the selected action.

In addition, the processor 130 trains the simultaneous interpretation model on the basis of a bilingual corpus having a source language sentence as an input text and a target language sentence as an output text and on the basis of alignment information corresponding to words or tokens (hereinafter, words) in the bilingual corpus.

The above-described embodiments of the present invention may be implemented as a program (or an application) to be executed in combination with a server, which is hardware, and stored in a medium.

The program may include codes coded in a computer language C, C++, Java, a machine language, etc., that can be read by a processor (a central processing unit (CPU)) of a computer through a device interface of the computer in order for the computer to read the program and execute the methods implemented as the program. The code may include a functional code that is related to a function that defines functions needed to execute the methods and may include an execution procedure related control code needed to cause the processor of the computer to execute the functions according to a predetermined procedure. In addition, the code may further include a memory reference related code as to whether additional information or media needed to cause the processor of the computer to execute the functions should be referred to at a location (an address) of an internal or external memory of the computer. In addition, when the processor of the computer needs to communicate with any other computers or servers, etc. at a remote site, to perform the above-described functions, the code may further include communication related codes such as how to communicate with any other computers or servers at a remote site and what information or media should be transmitted or received during communication.

The storage medium does not refer to a medium that stores data for a short period of time, such as a register, cache, memory, etc., but refers to a medium that stores data semi-permanently and can be read by a device. Specifically, examples of the storage medium include may include a read-only memory (ROM), a random-access memory (RAM), a compact disc (CD)-ROM, a magnetic tape, a floppy disk, an optical data storage device, etc. but are not limited thereto. That is, the program may be stored in various recording media on various servers which the computer can access or on various recording media on the computer of the user. In addition, the medium may be distributed over computer systems connected through a network so that computer-readable codes may be stored in a distributed manner.

The operations of the method or algorithm described in connection with the embodiment of the present invention may be implemented directly in hardware, implemented in a software module executed by hardware, or implemented in a combination thereof. Software modules may reside in a RAM, a ROM, an Erasable Programmable ROM (EPROM), an Electrically Erasable Programmable ROM (EEPROM), a flash memory, a hard disk, a removable disk, a CD-ROM, or any other form of computer-readable recording medium known in the art to which the present invention pertains.

As is apparent from the above, in training a simultaneous interpretation model that needs to continuously determine whether an intermediate interpretation result is providable in a situation where an utterance of a speaker is in progress, action information related to read and write actions is extracted from word-to-word alignment information together with the existing bilingual corpus and is also learned, thereby more accurately determining whether an intermediate interpretation result is providable. Accordingly, the present invention can provide an interpretation result with a high accuracy rate as well as providing rapidness in reducing a waiting time for the listener.

The effects of the present invention are not limited to those described above, and other effects not mentioned above will be clearly understood by those skilled in the art from the above detailed description.

Although the present invention has been described in detail above with reference to the exemplary embodiments, those of ordinary skill in the technical field to which the present invention pertains should be able to understand that various modifications and alterations may be made without departing from the technical spirit or essential features of the present invention. Therefore, it should be understood that the disclosed embodiments are not limiting but illustrative in all aspects.

What is claimed is:

1. A method of training a real-time simultaneous interpretation model based on external alignment information, which is performed by a computer having a memory and a processor, the method comprising:
receiving a bilingual corpus having a source language sentence as an input text and a target language sentence as an output text;
generating alignment information corresponding to words or tokens in the bilingual corpus;
determining a second action following a first action in the simultaneous interpretation model on the basis of the alignment information to generate action sequence information; and
training the simultaneous interpretation model on the basis of the bilingual corpus and the action sequence information,
wherein the first action and the second action represent a read action of reading the word in the input text or a write action of outputting an intermediate interpretation result corresponding to the read action performed up to a present,
wherein the generating of the alignment information corresponding to the words in the bilingual corpus includes matching an index of the word in the output text of the bilingual corpus with an index of the word in the input text of the bilingual corpus that corresponds to the word in the output text to generate the arrangement information,
wherein the determining of the second action following the first action in the simultaneous interpretation model on the basis of the alignment information to generate the action sequence information includes:
extracting a first input word index for the word of the input text corresponding to the read action performed up to the present in the simultaneous interpretation model;
extracting a first output word index for the word of the output text corresponding to the write action prior to the read action performed up to the present;
on the basis of alignment information of the word of the output text having a second output word index that is to be output after the first output word index, extract the words of the input text having an alignment relationship with the second output word index;
comparing the word, which has a largest index, among the extracted words of the input text with the first input word index; and
recording the read action or the write action in the action sequence information on the basis of a comparison result.

2. The method of claim 1, wherein, when the first action is the read action and the second action is the write action, the write action is an action of outputting a result of direct intermediate interpretation of the word corresponding to the read action or a result of intermediate interpretation of the word predicted to be arranged at a location of the word corresponding to the read action.

3. The method of claim 1, wherein the recording of the read action or the write action in the action sequence information on the basis of the comparison result includes:
when the first input word index is smaller than the largest index, recording the read action in the action sequence information; and
when the first input word index is greater than the largest index, recording the write action in the action sequence information.

4. The method of claim 3, wherein the recording of the read action or the write action in the action sequence information on the basis of the comparison result includes:
after the recording of the read action in the action sequence information, comparing a second input word index for the word of the input text corresponding to an index next to the first input word index with the largest index; and
when the second input word index is smaller than the largest index, recording the read action in the action sequence information, and when the second input word index is greater than the largest index, recording the write action in the action sequence information.

5. The method of claim 1, wherein the determining of the second action following the first action in the simultaneous interpretation model on the basis of the alignment information to generate the action sequence information further includes performing the read action as the second action following the first action a predetermined number of times.

6. The method of claim 1, wherein the training of the simultaneous interpretation model on the basis of the bilingual corpus and the action sequence information includes:
generating an action-combined output text having the read action of the action sequence information replaced with a preset special symbol and the write action of the action sequence information replaced with an output word of the output text; and
training the simultaneous interpretation model on the basis of the input text and the action-combined output text.

7. The method of claim 6, wherein the training of the simultaneous interpretation model on the basis of the input text and the action-combined output text includes:
inputting the input texts which are given as inputs up to the present at a current time t to an encoder of the simultaneous interpretation model; and
outputting an output text corresponding to the input text from a decoder of the simultaneous interpretation model at the current time t.

8. The method of claim 7, wherein the inputting of the input texts given as inputs up to the present at the current time t to the encoder of the simultaneous interpretation model includes inputting the input texts given as inputs up to the present at the current time t to the encoder of the simultaneous interpretation model as a form of a monotonic reduction function for a number of previous context words to be referenced by the encoder such that the output text is output at the current time t.

9. The method of claim 1, further comprising:
generating a speech recognition result for a speech uttered by a speaker in real time;
inputting the speech recognition result into the trained simultaneous interpretation model;
selecting one of the read action and the write action in the simultaneous interpretation model; and
providing an interpretation result of performing the selected action.

10. A method for real-time simultaneous interpretation using a simultaneous interpretation model trained based on external alignment information, which is performed by a computer having a memory and a processor, the method comprising:
generating a speech recognition result for a speech uttered by a speaker in real time;
inputting the speech recognition result into a pre-trained simultaneous interpretation model;
selecting one of a read action of further receiving the speech of the speaker and a write action of outputting an intermediate interpretation result corresponding to the read action performed up to a present in the simultaneous interpretation model; and
providing an interpretation result on the basis of the selected action,
wherein the pre-trained simultaneous interpretation model is trained on the basis of a bilingual corpus having a source language sentence as an input text and a target language sentence as an output text, alignment information matching and index of the word in the output text corresponding to words or tokens in the bilingual corpus and action sequence information indicating a second action following a first action in the simultaneous interpretation model on the basis of the alignment information,
wherein the alignment information is generated by,
extracting a first input word index for the word of the input text corresponding to the read action performed up to the present in the simultaneous interpretation model;
extracting a first output word index for the word of the output text corresponding to the write action prior to the read action performed up to the present;

on the basis of alignment information of the word of the output text having a second output word index that is to be output after the first output word index, extract the words of the input text having an alignment relationship with the second output word index;

comparing the word, which has a largest index, among the extracted words of the input text with the first input word index; and recording the read action or the write action in the action sequence information on the basis of a comparison result.

11. A system for real-time simultaneous interpretation based on external alignment information, the system comprising:

a communication module configured to receive a speech recognition result for a speech uttered by a speaker in real time and output a simultaneous interpretation result corresponding to the uttered speech;

a memory configured to store a program for generating and providing the simultaneous interpretation result on the basis of a pre-trained simultaneous interpretation model; and a processor configured to execute the program stored in the memory, wherein the processor executes the program for selecting one of a read action of further receiving the speech of the speaker and a write action of outputting an intermediate interpretation result corresponding to the read action up to a present in the simultaneous interpretation model and provide an interpretation result based on the selected action, and the processor trains the simultaneous interpretation model on the basis of a bilingual corpus having a source language sentence as an input text and a target language sentence as an output text, and alignment information matching and index of the word in the output text corresponding to words or tokens in the bilingual corpus and action sequence information indicating a second action following a first action in the simultaneous interpretation model on the basis of the alignment information, wherein the processor extracts a first input word index for the word of the input text corresponding to the read action performed up to the present in the simultaneous interpretation model, extracts a first output word index for the word of the output text corresponding to the write action prior to the read action performed up to the present, on the basis of alignment information of the word of the output text having a second output word index that is to be output after the first output word index, extracts the words of the input text having an alignment relationship with the second output word index, compares the word, which has a largest index, among the extracted words of the input text with the first input word index, and records the read action or the write action in the action sequence information on the basis of a comparison result.

* * * * *